United States Patent
Le Borgne et al.

(10) Patent No.: US 9,758,238 B2
(45) Date of Patent: Sep. 12, 2017

(54) ACCESSORY DRIVE GEARBOX FOR CONTROLLING THE FLAPS OF AN AIRCRAFT

(71) Applicant: TURBOMECA, Bordes (FR)

(72) Inventors: Eric Le Borgne, Igon (FR); Alexandre Machin, Poissy (FR)

(73) Assignee: TURBOMECA, Bordes (FR)

( * ) Notice: Subject to any disclaimer, the term of this patent is extended or adjusted under 35 U.S.C. 154(b) by 117 days.

(21) Appl. No.: 14/425,360

(22) PCT Filed: Aug. 27, 2013

(86) PCT No.: PCT/FR2013/051978
§ 371 (c)(1),
(2) Date: Mar. 3, 2015

(87) PCT Pub. No.: WO2014/037650
PCT Pub. Date: Mar. 13, 2014

(65) Prior Publication Data
US 2015/0232171 A1 Aug. 20, 2015

(30) Foreign Application Priority Data
Sep. 5, 2012 (FR) .................................... 12 58289

(51) Int. Cl.
*B64C 13/40* (2006.01)
(52) U.S. Cl.
CPC .................. *B64C 13/40* (2013.01)
(58) Field of Classification Search
CPC ........ B64C 13/40; B64C 9/323; F15B 15/204
See application file for complete search history.

(56) References Cited

U.S. PATENT DOCUMENTS

| 2007/0278874 A1 | 12/2007 | Abousleiman et al. |
| 2008/0006114 A1* | 1/2008 | Reul ...................... F15B 15/149 74/473.11 |
| 2011/0146434 A1* | 6/2011 | Short ...................... F16D 11/04 74/405 |

(Continued)

FOREIGN PATENT DOCUMENTS

| DE | 2 325 592 | 12/1974 |
| EP | 1 857 657 | 11/2007 |

(Continued)

OTHER PUBLICATIONS

International Search Report Issued Jan. 20, 2014 in PCT/FR13/051978 Filed Aug. 27, 2013.

*Primary Examiner* — Valentina Xavier
(74) *Attorney, Agent, or Firm* — Oblon, McClelland, Maier & Neustadt, L.L.P.

(57) ABSTRACT

An accessory gearbox for a turboshaft engine of an aircraft, the gearbox including a casing, an aircraft wing flap control rod arranged so as to slide axially inside the gearbox and an actuator for driving the control rod which is mounted on the casing, the actuator including a hollow body, a piston which is arranged so as to move in translation inside the body and a piston rod which is connected to the piston and extends at least in part outside the body of the actuator the piston rod being connected to the control rod, wherein the actuator is arranged between the connection of the piston rod and the control rod, and the casing of the gearbox.

10 Claims, 2 Drawing Sheets

(56) References Cited

U.S. PATENT DOCUMENTS

| | | |
|---|---|---|
| 2011/0148233 A1 | 6/2011 | Lemmers, Jr. et al. |
| 2011/0148234 A1 | 6/2011 | Lemmers, Jr. et al. |
| 2011/0148235 A1 | 6/2011 | Lemmers, Jr. et al. |
| 2013/0234506 A1 | 9/2013 | Langford et al. |
| 2016/0096617 A1* | 4/2016 | Ito .......................... B64C 9/323 92/51 |

FOREIGN PATENT DOCUMENTS

| | | |
|---|---|---|
| EP | 2 337 188 | 6/2011 |
| FR | 2 968 716 | 6/2012 |

* cited by examiner

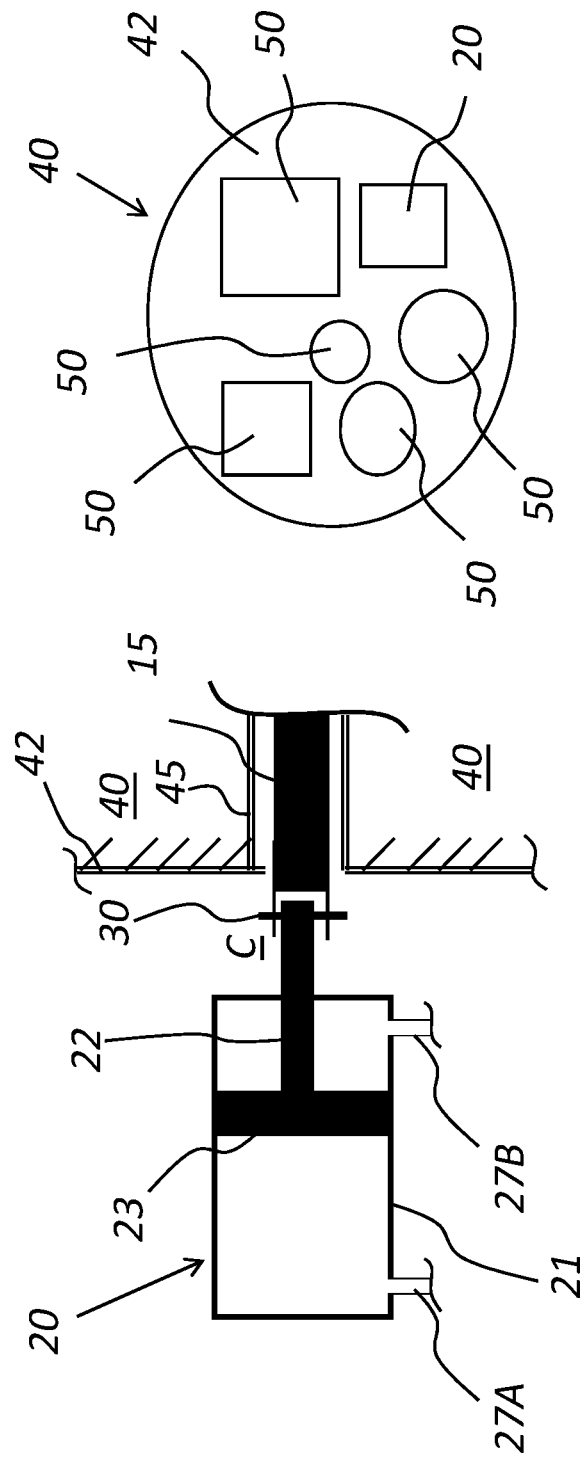

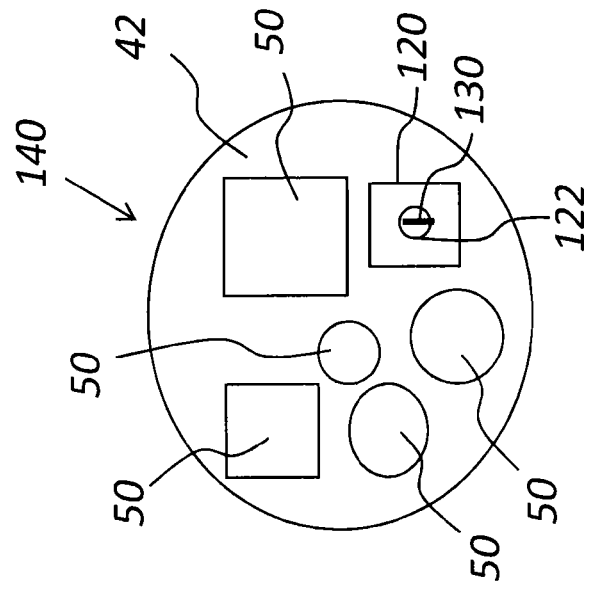
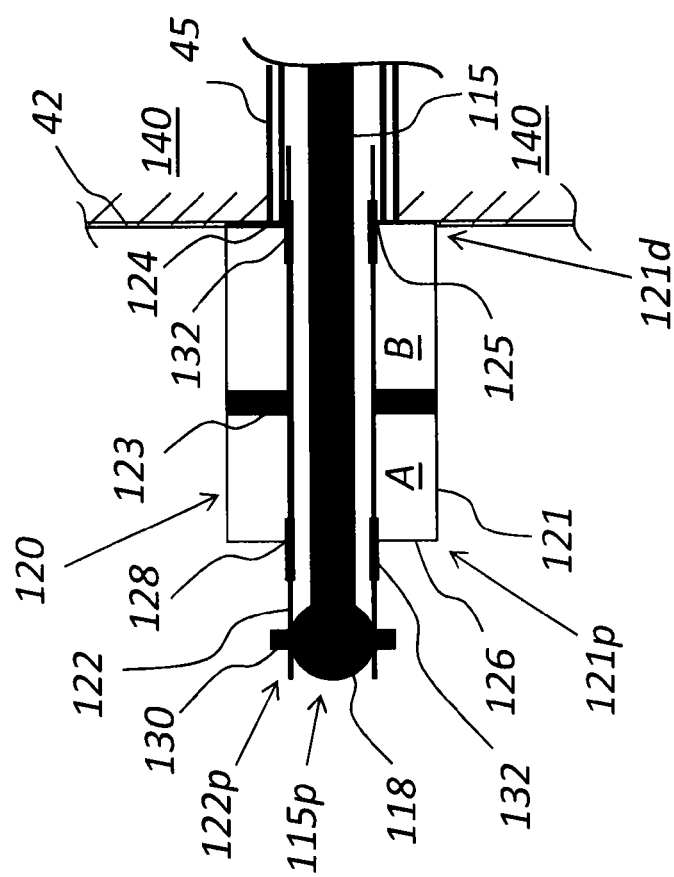
Figure 4
Figure 3

ACCESSORY DRIVE GEARBOX FOR CONTROLLING THE FLAPS OF AN AIRCRAFT

BACKGROUND OF THE INVENTION

Field of the Invention

The invention relates to an accessory gearbox for controlling at least one wing flap of an aircraft, in particular of a helicopter.

Description of the Related Art

As shown in FIGS. 1 and 2, an aircraft such as a helicopter comprises, in a known manner, a front-access (or frontal) engine comprising a gearbox 40 for peripheral equipment 50 of said engine, referred to as the accessory gearbox 40. Here and in the following, the term "front" means the side from which the accessory gearbox 40 is accessed for carrying out maintenance thereof. In the same way, the term "rear" means the side opposite the front side with respect to the accessory gearbox 40.

As shown in FIG. 1, an accessory gearbox 40 of this kind comprises, in a known manner, a wing flap control rod 15 extending in part inside a conduit 45 of the gearbox 40 so as to slide inside said conduit when it is driven in translation.

It is known to mount an actuator 20 for driving said control rod 15 on the front face of the casing 42 of such a gearbox 40 by means of fixing arms (not shown).

The actuator 20 comprises a hollow body 21 inside which a piston 23 slides, said piston being mounted on a piston rod 22, referred to as a power rod, extending in part outside the body. The control rod 15 is connected at one end to the wing flaps to be controlled and, at the other end, end-to-end with the free end of the piston rod 22 outside the body. The piston rod 22 and the control rod 15 are connected by means of a connection shaft 30 perpendicularly crossing the control rod 15 and the piston rod 22 and fixing them together for conjoint translational movement. Thus, progressing from the front to the rear, there is firstly the body of the actuator 20, then the portion of the piston rod 22 which extends outside the body, and finally the wing flap control rod 15, as shown in FIG. 2. When the actuator 20 is actuated, the circulation of fluids on either side of the piston 23 causes said piston to move in one direction or the other such that the piston rod 22 in turn drives in translation the wing flap control rod 15.

When the engine is undergoing maintenance, it is necessary to mount (or demount) the connection shaft 30 between the piston rod 22 and the control rod 15. However, as shown in FIG. 1, this connection shaft 30 cannot be accessed directly from the front by an operator as it is located behind the actuator 20 in a region C located between the body of the actuator 20 and the accessory gearbox 40. An assembly of this kind therefore requires at least part of the peripheral equipment 50 of the gearbox 40 to be demounted in order to gain lateral access to the connection shaft 30, thereby leading to wasted time and increasing the aircraft maintenance costs, and thus has a first drawback.

Moreover, despite demounting the peripheral equipment 50 of the gearbox 40 in this way, the connection shaft 30 remains difficult to access and the handling of the shaft 30 for mounting (or demounting) is carried out blind by the operator, making it more complex and time-consuming, which is a second drawback.

Furthermore, as shown in FIG. 1, arranging a region C providing access to the connection shaft 30 between the accessory gearbox 40 and the actuator 20 requires the actuator 20 to be moved away from the accessory gearbox 40 towards the front. Such a relocation requires the actuator 20 to be mounted on the accessory gearbox 40 with a significant overhang, which makes the actuator 20 particularly vulnerable to the various vibratory movements of the turboshaft engine, resulting in problems with the mechanical strength of the fixings of the actuator 20 to the casing 42 of the accessory gearbox 40, which is a third drawback.

Finally, a portion of the external fluid inlet and outlet ducts 27A and 27B of the actuator 20, shown in part in FIG. 1, may prevent access to the access region C, thereby further complicating maintenance operations, which is a fourth drawback.

BRIEF SUMMARY OF THE INVENTION

The invention was originally intended to solve a problem relating to the use of a hydraulic actuator, but it also applies to any kind of actuator, for example a pneumatic, electric, electropneumatic, electromechanical or electrohydraulic actuator, etc.

The aim of the present invention is to eliminate these drawbacks at least partially by proposing an accessory gearbox for controlling wing flaps of an aircraft, which gearbox allows simple and rapid mounting and demounting of the connection between the piston rod and the wing flap control rod so as to reduce the time and cost of the aircraft maintenance.

The invention therefore relates to an accessory gearbox for a turboshaft engine of an aircraft, said gearbox comprising a casing, an aircraft wing flap control rod arranged so as to slide axially inside said gearbox and an actuator for driving said control rod which is mounted on said casing, said actuator comprising a hollow body, a piston which is arranged so as to move in translation inside said body and a piston rod which is connected to said piston and extends at least in part outside the body of the actuator, said piston rod being connected to the control rod, the gearbox being notable in that the body of the actuator is arranged between the connection of the piston rod and the control rod, and the casing of the gearbox.

Such a gearbox allows the connection between the piston rod and the control rod to be relocated in front of the actuator. Here and in the following, the term "front" means the side on which an operator stands in order to carry out maintenance of the accessory gearbox. The term "rear" means the side opposite the front side with respect to the accessory gearbox.

Maintenance is therefore simple and rapid for an operator standing in front of the accessory gearbox, as said operator has direct access to the connection between the piston rod and the control rod so as to be able to mount or demount said connection.

Moreover, such an actuator can be directly mounted flat on the casing of the accessory gearbox in such a way that it is no longer necessary to arrange an access region between the actuator and the accessory gearbox, making it possible to reduce the overhang of the actuator with respect to the accessory gearbox and thus to make the actuator more able to withstand the vibrations generated by the engine.

When the body of the actuator is mounted flat directly on the casing, the external fluid inlet and outlet ducts of the actuator can be directly incorporated through the casing of the gearbox so as to free up space around the body of the actuator. For example, one of the ducts can be directly incorporated in a wall of the body of the actuator and the other duct can extend from the body directly through the casing.

Preferably, the piston rod is hollow and crosses right through the hollow body, the control rod being arranged coaxially inside the piston rod.

Thus, passing the control rod through the body of the actuator allows the piston rod and the control rod to be connected in front of the actuator.

According to one feature of the invention, the body of the actuator comprises, in the region of its distal end, a first wall comprising a first opening through which the piston rod slides and, in the region of its proximal end, a second wall comprising a second opening through which the piston rod also slides, the piston rod and the control rod being connected in the region of their respective proximal ends so as to be fixed together for conjoint translational movement. The axial length of the piston rod is therefore greater than the axial length of the hollow body of the actuator.

Here and in the following, the term "proximal" means closest to the side of the gearbox where an operator stands in order to gain access thereto for carrying out maintenance thereof. In the same way, here and in the following, the term "distal" means furthest from the side of the gearbox where an operator stands in order to gain access thereto for carrying out maintenance thereof.

According to one aspect of the invention, the connections between the piston rod and the first opening and the second opening respectively are sealed. The actuator preferably comprises a seal in the region of each sliding opening for the piston so as to seal the connection between the piston rod and the body of the actuator.

The piston rod and the control rod are preferably connected by a connection shaft perpendicularly crossing the piston rod and the control rod. The use of a connection shaft of this kind makes it possible to firmly hold the piston rod and the control rod for conjoint translational movement.

Advantageously, the control rod comprises a ball joint in the region of its proximal end for blocking the control rod inside the piston rod. The blocking ball joint is preferably in the form of a ball which is in direct contact with the piston rod across an entire annular surface. A ball joint of this kind makes it possible to avoid any play between the control rod and the piston rod in the region of the connection thereof.

According to one feature of the invention, the fixing shaft crosses right through the ball joint. A connection of this kind makes it possible to rigidly connect the control rod to the piston rod and to hold them coaxially with respect to one another.

According to another feature of the invention, the piston is arranged between the proximal end and the distal end of the piston rod, preferably substantially in the centre of said rod. Positioning the piston in this way makes it possible to free up the proximal end of the piston rod so as to permit the piston rod and the control rod to be connected in the region of their respective proximal ends. The piston thus separates the piston rod into a distal portion and a proximal portion, said proximal portion thus comprising the connection between the piston rod and the control rod.

The piston is preferably in the form of a disc extending transversely to the shaft of the piston rod.

According to one aspect of the invention, the piston separates the interior of the hollow body of the actuator into a proximal space and a distal space, the body comprising a first circulation duct for a first fluid, extending between the proximal space and the casing of the gearbox, and a second circulation duct for a second fluid, extending between the distal space and the casing of the gearbox.

Preferably, the first duct is incorporated into a wall of the hollow body so as to open outside the body in the region of the casing of the gearbox and/or the second duct opens outside the body in the region of the casing of the gearbox. The actuator thus has a limited space requirement and can be mounted flat directly against the casing of the gearbox which limits the overhang of the actuator with respect to the accessory gearbox.

The invention also relates to a method for mounting an actuator as defined above, comprising a step of arranging the body of the actuator on the casing of the gearbox and a step of connecting the piston rod to the control rod in such a way that the body of the actuator is arranged between the connection of the piston rod and the control rod, and the casing of the gearbox.

The method preferably comprises a step of arranging the control rod coaxially inside the piston rod and a step of connecting the control rod and the piston rod, preferably by means of a connection shaft, in the region of their respective proximal ends.

The invention also relates to an aircraft, in particular of the helicopter type, comprising a turboshaft engine, at least one wing flap to be controlled and an accessory gearbox as defined above, the control rod of which is connected to said wing flap.

BRIEF DESCRIPTION OF THE SEVERAL VIEWS OF THE DRAWINGS

Other features and advantages of the invention will become apparent upon reading the following description, with reference to the accompanying drawings given by way of non-limiting example and in which identical reference signs are given to similar elements.

FIG. 1 is a schematic cross-sectional view of an accessory gearbox from the prior art.

FIG. 2 shows the front face of an accessory gearbox from the prior art.

FIG. 3 is a schematic cross-sectional view of an accessory gearbox according to the invention.

FIG. 4 shows the front face of an accessory gearbox according to the invention.

DESCRIPTION OF THE ACCESSORY GEARBOX ACCORDING TO THE INVENTION

As shown schematically in FIG. 4, an aircraft such as a helicopter comprises, in a known manner, a front-access (or frontal) engine comprising a gearbox 140 for peripheral equipment 50 of said engine, referred to as the accessory gearbox.

As shown in FIGS. 3 and 4, an accessory gearbox 140 comprises a casing 42 in which a conduit 45 is formed, inside which conduit an aircraft wing flap control rod 115 is arranged so as to slide axially inside said conduit 45. In other words, translational movement of the control rod 115 makes it possible to modify the inclination of at least one wing flap of the aircraft.

With reference to FIG. 3, the accessory gearbox 140 comprises an actuator 120 for driving said control rod 115 which is mounted on the front face of said casing 42 of the accessory gearbox 140.

The actuator 120 comprises a hollow body 121 in which a piston rod 122 is mounted, which rod is rigidly connected to a piston 123.

The body 121 of the actuator 120 is in the form of a longitudinal cylinder which extends perpendicularly to the front face of the casing 42 and can have various cross sections, in particular a square or circular cross section.

The body 121 comprises, in the region of its distal end 121d, a first wall 124 comprising a first opening 125 through which the piston rod 122 slides and, in the region of its proximal end 121p, a second wall 126 comprising a second opening 128 through which the piston rod 122 slides.

The piston 123 is mounted on the piston rod 122, substantially in the centre thereof, and forms a one-piece structure. The piston 123 is arranged so as to move in translation inside the body 121 along the axis of the actuator 120. The piston 123 separates the internal volume of the body 121 into two spaces A and B, it being possible for each space to be occupied at least in part by a fluid able to enter and leave said space via a duct (not shown). Thus, in a known manner, the piston 123 can be moved by modifying the fluid pressure in the spaces A, B of the body 121.

Preferably, a longitudinal wall of the hollow body 121 incorporates at least one of said ducts so as to permit fluid connection to the casing 42 of the gearbox 140 while limiting the overall space requirement of the actuator 120.

The piston rod 122 is in the form of a hollow cylindrical tube, inside which the control rod 115 is arranged coaxially. In this example, with reference to FIG. 3, the axial length of the piston rod 122 is greater than the axial length of the hollow body 121 of the actuator 120.

The piston rod 122 and the wing flap control rod 115 are connected, in the region of their respective proximal ends 122p and 115p, by a connection shaft 130 fixing them together for conjoint translational movement.

The control rod 115 comprises, in the region of its proximal end 115p, a ball joint 118 for blocking the control rod 115 inside the piston rod 122, the connection shaft 130 crossing right through the ball joint 118.

A connection of this kind thus makes it possible to arrange and hold the body 121, the piston rod 122, the piston 123 and the control rod 115 coaxially with respect to one another.

Seals 132, for example in an X shape, are arranged, for example in bearings, between the piston rod 122 and the body 121 in the region of the openings 125 and 128 respectively so as to seal the connections between the piston rod and the body of the actuator.

FIG. 4 shows the front face of the accessory gearbox 140 according to the invention and in particular the connection between the piston rod 122 and the control rod 115 made by the connection shaft 130, access to which shaft, which is in front of the actuator 120, is thus simpler for an operator.

Accessibility of this kind makes it possible to avoid demounting peripheral equipment 50, thereby simplifying the maintenance of the accessory gearbox and making it possible to reduce the time requirement and the costs thereof.

Assembly of the Actuator

In order to mount the actuator on the casing 42 of the accessory gearbox 140, in a first step, the body of the actuator 121 is firstly arranged on the casing 42 of the gearbox 140 such that the control rod 115 is inserted inside the piston rod 122 and then, in a second step, the piston rod 122 is connected to the control rod 115 in the region of their respective proximal ends 115p and 122p by means of a connection shaft 130 such that the body 121 of the actuator 120 is arranged between the connection shaft 130 and the casing 42 of the gearbox 140.

With reference to FIG. 4, an operator can thus very easily mount or demount the connection shaft 130 which is located in front of the actuator and is therefore easier and quicker for an operator to access compared with the prior art.

Use of the Actuator

In order to actuate the actuator 120, the pressure of the fluid in the ducts (not shown) supplying the spaces A, B of the hollow body 121 is regulated such that the piston 123 moves inside the hollow body 121 in the desired direction.

Advantageously, one or both of the ducts supplying the spaces A and B with fluid can be directly incorporated at least in part in the accessory gearbox 140 so as to free up the space around the actuator 120. Indeed, since the connection shaft 130 is located in front of the hollow body 121, it is no longer necessary to provide a space between the hollow body 121 and the casing 42.

When the piston 123 moves, in one direction or the other, inside the hollow body 121, it drives the piston rod 122 in translation.

When it slides through the body 121, the piston rod 122 in turn drives the control rod 115, thus making it possible to control the associated wing flaps.

The invention claimed is:

1. An accessory gearbox for a turboshaft engine of an aircraft, said gearbox comprising:
   a casing;
   an aircraft wing flap control rod arranged so as to slide axially inside said gearbox; and
   an actuator for driving said control rod which is mounted on said casing,
   said actuator comprising
      a hollow body,
      a piston which is arranged so as to move in translation inside said body, and
      a piston rod which is connected to said piston and extends at least in part outside the body of the actuator, said piston rod being connected to the control rod,
   wherein the body of the actuator is arranged between the casing of the gearbox and a connection between the piston rod and the control rod.

2. The accessory gearbox according to claim 1, wherein the piston rod is hollow and crosses right through the hollow body, the control rod being arranged coaxially inside the piston rod.

3. The accessory gearbox according to claim 1, wherein the body of the actuator comprises, in a region of a distal end of the body of the actuator, a first wall comprising a first opening through which the piston rod slides and, in a region of a proximal end of the body of the actuator, a second wall comprising a second opening through which the piston rod slides, the piston rod and the control rod being connected in a region of respective proximal ends of the piston rod and of the control rod so as to be fixed together for conjoint translational movement.

4. The accessory gearbox according to claim 1, wherein the piston rod and the control rod are connected via a connection shaft perpendicularly crossing the piston rod and the control rod.

5. The accessory gearbox according to claim 4, wherein the control rod comprises a ball joint in a region of a proximal end of the control rod for blocking the control rod inside the piston rod.

6. The accessory gearbox according to claim 5, wherein the ball joint is in a form of a ball which is in direct contact with the piston rod across an entire annular surface.

7. The accessory gearbox according to claim 5, wherein the connection shaft crosses right through the ball joint.

8. The accessory gearbox according to claim 1, wherein the piston is arranged between a proximal end and a distal end of the piston rod.

9. The accessory gearbox according to claim 3, wherein a first connection between the piston rod and the first opening and a second connection between the piston rod and the second opening are sealed.

10. An aircraft comprising
   a turboshaft engine;
   at least one wing flap to be controlled; and
   an accessory gearbox according to claim 1,
   wherein the control rod of the accessory gearbox is connected to said wing flap.

* * * * *